L. S. FLATAU.
COOKING UTENSIL.
APPLICATION FILED JAN. 27, 1915.
1,162,762.
Patented Dec. 7, 1915.
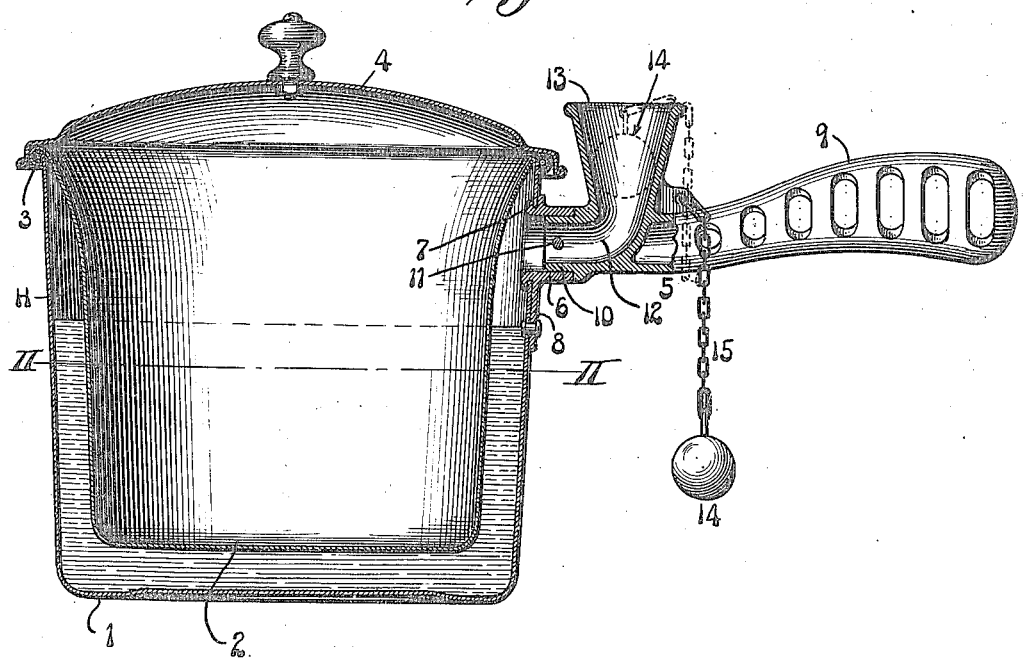
Fig. I.
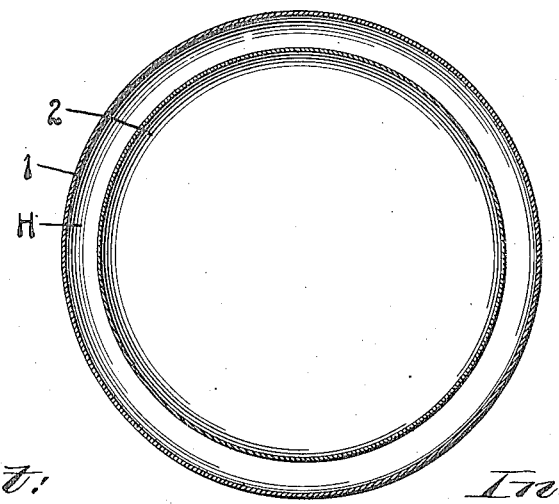
Fig. II.
Attest:
Wm H Scott
A. J. McCauley
Inventor:
L. S. Flatau
by

UNITED STATES PATENT OFFICE.

LOUIS S. FLATAU, OF ST. LOUIS, MISSOURI.

COOKING UTENSIL.

1,162,762.　　　Specification of Letters Patent.　　Patented Dec. 7, 1915.

Application filed January 27, 1915. Serial No. 4,645.

*To all whom it may concern:*

Be it known that I, LOUIS S. FLATAU, a citizen of the United States of America, a resident of the city of St. Louis, State of Missouri, have invented certain new and useful Improvements in Cooking Utensils, of which the following is a full, clear, and exact description, reference being had to the accompanying drawings, forming a part of this specification.

My invention relates to improvements in cooking utensils, the object being to provide a cooking utensil adapted to be used in boiling or baking meats, vegetables, cereals and other articles of food.

The preferred form of my invention comprises inner and outer vessels separated from each other and permanently connected together at their upper ends to provide a closed heating chamber which extends from the bottom of the outer vessel to the upper ends of both vessels. This heating chamber extending from top to bottom of both vessels may be considered as a hot air chamber or oven which completely surrounds the body of the inner vessel; or it may be utilized as a water container. The heat applied to the bottom of the outer vessel is transmitted through the heating chamber and distributed to all parts of the body of the inner vessel, instead of being concentrated at the lower end of the inner vessel. The heat is thus very effectively distributed throughout the food in the upper portion of the inner vessel.

Figure I is a vertical section of a cooking utensil embodying the features of my invention. Fig. II is a horizontal section on the line II—II, Fig. I.

The cooking utensil shown in the accompanying drawings comprises, an outer vessel 1 and an inner vessel 2 within said outer vessel, said vessels being separated from each other to provide a heating chamber H between them, and the upper ends of said vessels being brought together and curled outwardly and downwardly to permanently connect the vessels, and to permanently close the upper end of the heating chamber H. The vessels are thus permanently connected to form a single utensil having a heating chamber H which entirely surrounds the inner vessel and which extends from the bottom of the outer vessel to the upper ends of both vessels.

The object in curling the upper edges of the vessels outwardly, instead of inwardly, is to provide a double reinforcing bead 3 which lies exteriorly of the vessel where it will not catch any of the food which is poured from the inner vessel. If the vessels were connected by curling their upper edges inwardly, these inturned edges would catch and hold some of the contents of the utensil and it would be quite difficult to remove the unsanitary matter from such inturned edges.

4 designates a lid fitted to the curled upper end of the inner vessel.

5 designates a handle consisting of a tubular section 6 passing through the outer vessel and having its inner end turned outwardly and upset against the inner face of the outer vessel as seen at 7. A flange 8 forming part of the tubular section 6, is riveted to the outer vessel. The handle section 9 has a tubular end 10 arranged within and closely fitted to the tubular section 6.

11 designates a rivet connecting the handle section 9 to the tubular section 6.

A vent 12, communicating with the heating chamber H, is formed in the handle, and the latter is provided with a funnel 13 at the outer end of said vent.

14 designates a ball valve, flexibly connected to the handle by means of a chain 15 and adapted to lie within the funnel 13 as shown by dotted lines, so as to form a closure for the vent 12.

Water may be introduced into the heating chamber H, through the funnel 13 and vent 12, and the ball valve 14 may be placed in the funnel 13 to prevent the free escape of heat from the heating chamber. The ball valve serves as a safety valve permitting the escape of steam under a pressure great enough to lift the ball, and preventing the escape of steam, hot air, or vapor under a lower pressure.

The outer vessel is preferably made of copper or some other material adapted to withstand the high temperature to which it is subjected in baking or roasting without water in the heating chamber; and the inner vessel is preferably made of aluminum.

By permanently connecting the upper ends of the vessels, and providing a normally closed vent at one side of the outer vessel, I provide a single utensil adapted for use in baking, roasting or boiling a great variety of foods; and since the heating chamber extends to the permanently connected upper ends of the vessels the food is thoroughly cooked throughout, all parts of the body of the vessel being subjected directly to the heating medium.

I claim:—

1. A cooking utensil comprising an outer vessel, an inner vessel united with and separated from the outer vessel to provide a heating chamber between the vessels, and a handle secured to said outer vessel, a vent communicating with said heating chamber being formed in said handle, and the handle being provided with a funnel at the outer end of said vent.

2. A cooking utensil comprising an outer vessel, and an inner vessel within said outer vessel, said vessels being separated from each other to provide a heating chamber between them and the upper ends of the vessels being brought together and curled outwardly and downwardly to permanently connect the vessels and to permanently close the upper end of said heating chamber, a handle secured to said outer vessel, a vent communicating with said heating chamber being formed in said handle, the handle being provided with a funnel at the outer end of said vent, a ball valve arranged in said funnel to form a closure for said vent, and a flexible member connecting said ball valve to the handle.

LOUIS S. FLATAU.

In the presence of—
A. J. McCAULEY,
E. K. CLARK.